United States Patent
Namekawa et al.

(10) Patent No.: US 10,391,843 B2
(45) Date of Patent: Aug. 27, 2019

(54) VEHICLE SUN VISOR

(71) Applicant: KYOWA SANGYO CO., LTD., Toyota-shi, Aichi (JP)

(72) Inventors: Hiroki Namekawa, Chiryu (JP); Yuta Kinoshita, Nagoya (JP); Norio Ebisuoka, Nagoya (JP)

(73) Assignee: KYOWA SANGYO CO., LTD., Toyota (JP)

( * ) Notice: Subject to any disclaimer, the term of this patent is extended or adjusted under 35 U.S.C. 154(b) by 0 days.

(21) Appl. No.: 15/161,508

(22) Filed: May 23, 2016

(65) Prior Publication Data

US 2016/0355074 A1 Dec. 8, 2016

(30) Foreign Application Priority Data

Jun. 3, 2015 (JP) .................................. 2015-113452

(51) Int. Cl.
*B60J 3/02* (2006.01)

(52) U.S. Cl.
CPC ........... *B60J 3/0282* (2013.01); *B60J 3/0278* (2013.01)

(58) Field of Classification Search
CPC .... B60R 1/12; B60R 1/04; B60R 1/00; B60R 2001/1269; B60R 2011/008; B60R 7/05; B60J 3/0282; B60J 3/0204
USPC ....................................................... 359/844
See application file for complete search history.

(56) References Cited

U.S. PATENT DOCUMENTS

| 4,000,404 | A | * | 12/1976 | Marcus | B60J 3/0282 296/97.5 |
|---|---|---|---|---|---|
| 4,858,983 | A | * | 8/1989 | White | B60J 3/0282 296/97.1 |
| 5,205,639 | A | | 4/1993 | White et al. | |
| 6,264,352 | B1 | * | 7/2001 | Zapinski | B60Q 3/252 362/135 |
| 6,959,956 | B1 | * | 11/2005 | Fero | B60J 3/0278 296/214 |

(Continued)

FOREIGN PATENT DOCUMENTS

| CN | 1636798 A | 7/2005 |
|---|---|---|
| CN | 104210336 A | 12/2014 |

(Continued)

OTHER PUBLICATIONS

Jan. 2, 2018 Office Action issued in Chinese Patent Application No. 201610362681.5.

(Continued)

*Primary Examiner* — Jade R Chwasz
(74) *Attorney, Agent, or Firm* — Oliff PLC

(57) ABSTRACT

A vehicle sun visor includes a sun visor body supported with respect to a vehicle ceiling so as to be freely rotated between a storage position and a use position, and a mirror mounted in a mounting part provided in the sun visor body. If an area that is a part below the mounting part of the surface of the sun visor body located in the use position is designated a lower surface area, a plurality of reinforcement ribs extending in a short-axis direction of the sun visor body are provided in the lower surface area in parallel with one another at a predetermined interval in the long-axis direction of the sun visor body. The predetermined interval is shorter than a distance in a short-axis direction of the lower surface area.

9 Claims, 5 Drawing Sheets

(56) References Cited

U.S. PATENT DOCUMENTS

| | | | |
|---|---|---|---|
| 7,118,156 B2 | 10/2006 | Iwatsuka et al. | |
| 7,566,088 B2 * | 7/2009 | Araga | B60J 3/0278 |
| | | | 296/39.3 |
| 8,419,105 B2 * | 4/2013 | Fukatsu | B60J 3/0278 |
| | | | 296/97.1 |
| 2005/0145770 A1 | 7/2005 | Primo et al. | |
| 2014/0354005 A1 | 12/2014 | Primo et al. | |

FOREIGN PATENT DOCUMENTS

| | | |
|---|---|---|
| EP | 0 246 930 B1 | 12/1993 |
| ES | 1077957 U | 11/2012 |
| ES | 1078111 U | 11/2012 |
| JP | 2004-058890 A | 2/2004 |
| JP | 2005-88650 A | 4/2005 |
| JP | 2006130967 A | 5/2006 |
| JP | 2009107395 A | 5/2009 |
| JP | 2010-64628 A | 3/2010 |

OTHER PUBLICATIONS

Aug. 24, 2018 Office Action issued in Chinese Patent Application No. 201610362681.5.
Nov. 20, 2018 Office Action issued in Japanese Patent Application No. 2015-113452.
Mar. 28, 2019 Office Action issued in Indian Patent Application No. 201614018173.

* cited by examiner

VEHICLE SUN VISOR

CROSS-REFERENCE TO RELATED APPLICATIONS

The present application claims priority under 35 U.S.C. § 119 of Japanese Application No. 2015-113452 filed on Jun. 3, 2015, the disclosure of which is expressly incorporated by reference herein in its entirety.

BACKGROUND OF INVENTION

Technical Field

The present invention relates to a vehicle sun visor, and more particularly to a vehicle sun visor comprising a mirror on the surface side of a sun visor body.

Background Art

A generally known conventional vehicle sun visor includes: a sun visor body supported with respect to a vehicle ceiling so as to be freely rotated between a storage position and a use position; and a mirror mounted on a mounting part provided on the sun visor body (see, for example, Patent Literature 1: JP 2004-58890 A). This Patent Literature 1 discloses a technique for preventing the mirror from separating from the sun visor body as a result of falling in the recessed mounting part if the head of an occupant perpendicularly collides with the mirror surface of the sun visor body located in the use position, in the event of an accident or the like.

However, in the vehicle sun visor in the Patent Literature 1, planar rigidity of the sun visor body is not considered at all. Therefore, if the head of an occupant collides, from a planar direction of the sun visor body, with the lower edge of the sun visor body half-open between the storage position and use position in the event of accident or the like, that is, if load, impact, or the like is applied in a planar direction from the lower edge of the sun visor body, stress concentration at mirror corners increases, and the sun visor body may be, for example, broken or deformed, with the result that the mirror may be detached from the sun visor body and fly off.

SUMMARY OF INVENTION

The embodiments of the present invention have been proposed in view of the foregoing problems and, accordingly, it is an object of the embodiments of the present invention to provide a vehicle sun visor which, even if load, impact, or the like is applied in a planar direction from the lower edge of a sun visor body, prevents a mirror from being detached from the sun visor body and flying off.

One aspect of the present embodiments provides a vehicle sun visor including a sun visor body supported with respect to a vehicle ceiling so as to be freely rotated between a storage position and a use position, and a mirror mounted in a mounting part provided in the sun visor body, wherein if an area that is a part below the mounting part of the surface of the sun visor body located in the use position is designated a lower surface area, a plurality of reinforcement ribs extending in a short-axis direction of the sun visor body are provided in the lower surface area in parallel with one another at a predetermined interval in the long-axis direction of the sun visor body, the predetermined interval is shorter than a distance in a short-axis direction of the lower surface area.

In a further aspect, the lower surface area may be provided with a projecting reinforcement boss for joining a pair of half bodies composing the sun visor body.

In a further aspect, a plate thickness of a middle reinforcement part that includes at least part of the lower surface area and serves as a middle part of the sun visor body in a long-axis direction may be greater than a plate thickness of a portion of the sun visor body other than the middle reinforcement part.

In a further aspect, the reinforcement boss may include: a middle reinforcement boss disposed below and in a middle side of the mounting part in the long-axis direction; and an end reinforcement boss disposed below and in an end side of the mounting part in the long-axis direction.

In a further aspect, an additional reinforcement rib extending in the long-axis direction of the sun visor body may be provided in the lower surface area so as to cross the plurality of reinforcement ribs.

In a further aspect, an additional reinforcement rib extending in the long-axis direction of the sun visor body may be provided in the lower surface area so as to cross the plurality of reinforcement ribs, and the reinforcement boss may be disposed so as to cross the additional reinforcement rib and the reinforcement rib.

In a further aspect, the predetermined interval may be 5 to 15 mm, and the distance in the short-axis direction of the lower surface area may be 15 to 30 mm.

Another aspect of the present embodiments provides a vehicle sun visor including a sun visor body supported with respect to a vehicle ceiling so as to be freely rotated between a storage position and a use position, and a mirror mounted in a mounting part provided in the sun visor body, wherein if an area that is a part below the mounting part of the surface of the sun visor body located in the use position is designated a lower surface area, the lower surface area is provided with projecting reinforcement bosses for joining a pair of half bodies composing the sun visor body, the reinforcement bosses include: a middle reinforcement boss disposed below and in a middle side of the mounting part in a long-axis direction; and an end reinforcement boss disposed below and in an end side of the mounting part in the long-axis direction.

Another aspect of the present embodiments provides a vehicle sun visor including a sun visor body supported with respect to a vehicle ceiling so as to be freely rotated between a storage position and a use position, and a mirror mounted in a mounting part provided in the sun visor body, wherein if an area that is a part below the mounting part of the surface of the sun visor body located in the use position is designated a lower surface area, a plate thickness of a middle reinforcement part that includes at least part of the lower surface area and serves as a middle part of the sun visor body in a long-axis direction is greater than a plate thickness of a portion of the sun visor body other than the middle reinforcement part.

According to a vehicle sun visor according to the present embodiment, if an area that is a part below the mounting part of the surface of the sun visor body located in the use position is designated a lower surface area, a plurality of reinforcement ribs extending in the short-axis direction of the sun visor body are provided in the lower surface area in parallel with one another at a predetermined interval in the long-axis direction of the sun visor body. The predetermined interval is shorter than a distance in a short-axis direction of the lower surface area. By virtue of this, the planar rigidity of the lower surface area of the sun visor body is improved. Accordingly, even if load, impact, or the like is applied in a planar direction from the lower edge of the sun visor body, stress concentration at mirror corners is decreased. In addition, before cracking, deformation, or the like occurs in the sun visor body, the support parts of the sun visor body with respect to the vehicle ceiling are, for example, broken and, thereby, the sun visor body itself is detached from the vehicle ceiling. Consequently, the mirror is prevented from being detached from the sun visor body and flying off.

When the lower surface area is provided with a projecting reinforcement boss for joining a pair of half bodies composing the sun visor body, the planar rigidity of the lower surface area of the sun visor body is further improved.

When a plate thickness of a middle reinforcement part that includes at least part of the lower surface area and serves as a middle part of the sun visor body in a long-axis direction is greater than a plate thickness of a portion of the sun visor body other than the middle reinforcement part, the planar rigidity of the lower surface area of the sun visor body is further improved.

When the reinforcement boss includes: a middle reinforcement boss disposed below and in a middle side of the mounting part in the long-axis direction; and an end reinforcement boss disposed below and in an end side of the mounting part in the long-axis direction, the planar rigidity of the lower surface area of the sun visor body is further improved.

When an additional reinforcement rib extending in the long-axis direction of the sun visor body is provided in the lower surface area so as to cross the plurality of reinforcement ribs, the planar rigidity of the lower surface area of the sun visor body is further improved.

When an additional reinforcement rib extending in the long-axis direction of the sun visor body is provided in the lower surface area so as to cross the plurality of reinforcement ribs, and the reinforcement boss is disposed so as to cross the additional reinforcement rib and the reinforcement rib, the planar rigidity of the lower surface area of the sun visor body is further improved.

When the predetermined interval is 5 to 15 mm, and the distance in the short-axis direction of the lower surface area is 15 to 30 mm, the planar rigidity of the lower surface area of the sun visor body is further improved.

In another vehicle sun visor according to the present embodiment, if an area that is a part below the mounting part of the surface of a sun visor body located in a use position is designated a lower surface area, the lower surface area is provided with a projecting reinforcement boss for joining a pair of half bodies composing the sun visor body, and the reinforcement boss includes: a middle reinforcement boss disposed below and in a middle side of the mounting part in a long-axis direction; and an end reinforcement boss disposed below and in an end side of the mounting part in the long-axis direction. By virtue of this, the planar rigidity of the lower surface area of the sun visor body is improved. Accordingly, even if load, impact, or the like is applied in a planar direction from the lower edge of the sun visor body, stress concentration at mirror corners is decreased. In addition, before cracking, deformation, or the like occurs in the sun visor body, the support parts of the sun visor body with respect to the vehicle ceiling are, for example, broken and, thereby, the sun visor body itself is detached from the vehicle ceiling. Consequently, the mirror is prevented from being detached from the sun visor body and flying off.

In further another vehicle sun visor according to the present embodiment, if an area that is a part below the mounting part of the surface of a sun visor body located in a use position is designated a lower surface area, a plate thickness of a middle reinforcement part that includes at least part of the lower surface area and serves as a middle part of the sun visor body in a long-axis direction is greater than a plate thickness of a portion of the sun visor body other than the middle reinforcement part. By virtue of this, the planar rigidity of the lower surface area of the sun visor body is improved. Accordingly, even if load, impact, or the like is applied in a planar direction from the lower edge of the sun visor body, stress concentration at mirror corners is decreased. In addition, before cracking, deformation, or the like occurs in the sun visor body, the support parts of the sun visor body with respect to the vehicle ceiling are, for example, broken and, thereby, the sun visor body itself is detached from the vehicle ceiling. Consequently, the mirror is prevented from being detached from the sun visor body and flying off.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF EMBODIMENT

Figure 1:
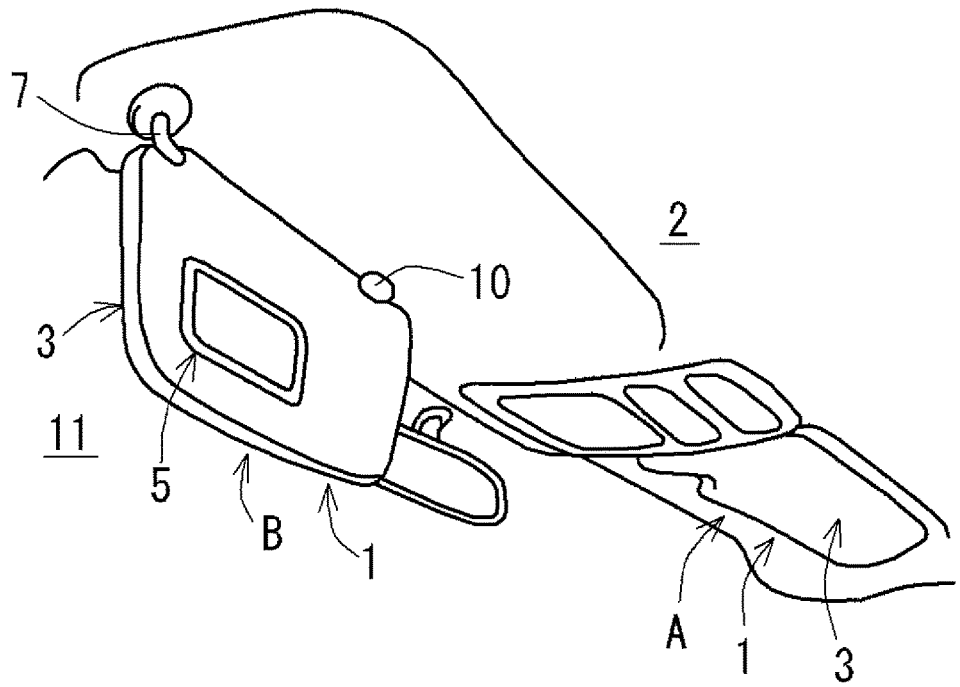
FIG. 1 is a perspective view in which a vehicle ceiling provided with a vehicle sun visor according to an embodiment is looked up from a vehicle cabin.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Vehicle Sun Visor

A vehicle sun visor according to the present embodiment is a vehicle sun visor (1) (e.g., see FIG. 1 and so on) that includes: a sun visor body (3) supported so as to be freely rotated with respect to a vehicle ceiling (2) and between a storage position (A) and a use position (B); and a mirror (5) mounted on a mounting part (13) provided on the sun visor body (3). An area that is a part below the mounting part (13) of the surface of the sun visor body (3) located in the use position (B) is designated a lower surface area (21). In this area (21), a plurality of reinforcement ribs (23) extending in the short-axis direction (Q) of the sun visor body are provided in parallel with one another at a predetermined interval (p) in the long-axis direction (P) of the sun visor body. The predetermined interval (p) is shorter than a distance (L) in a short-axis direction of the lower surface area (21) (see FIGS. 4, 5A, and so on).

The predetermined interval (p) described above may be, for example, 5 to 15 mm (preferably, 7 to 10 mm). The distance (L) in the short-axis direction of the lower surface area (21) may be, for example, 15 to 30 mm (preferably, 20 to 25 mm). The lower surface area (21) is generally long in the long-axis direction (P) of the sun visor body (3).

For example, the vehicle sun visor according to the present embodiment can take a form (see FIGS. 3, 4, for example) in which a projecting reinforcement boss (26) for joining a pair of half bodies (3a, 3b) composing the sun visor body (3) is provided in the lower surface area (21).

In the foregoing form, the reinforcement boss (26) may include, for example, a middle reinforcement boss (26a) disposed below and in a middle side of the mounting part (13) in the long-axis direction, and an end reinforcement boss (26b, 26c) disposed below and in an end side of the mounting part (13) in the long-axis direction (see, for example, FIG. 4 and so on).

For example, the vehicle sun visor according to the present embodiment can take a form (see, for example, FIGS. 3, 5B and so on) in which a plate thickness (t1) of a middle reinforcement part (34), which includes at least part of the lower surface area (21) and serves as the middle part of the sun visor body (3) in the long-axis direction, is greater than a plate thickness (t2) of the portion of the sun visor body (3) other than the middle reinforcement part (34).

The vehicle sun visor according to the present embodiment can take, for instance, a form (see, for example, FIG. 4 or the like) in which an additional reinforcement rib (31) extending in the long-axis direction (P) of the sun visor body is provided in the lower surface area (21) so as to cross the plurality of reinforcement ribs (23). By virtue of this, the planar rigidity of the lower surface area of the sun visor body is further improved.

Figure 4:
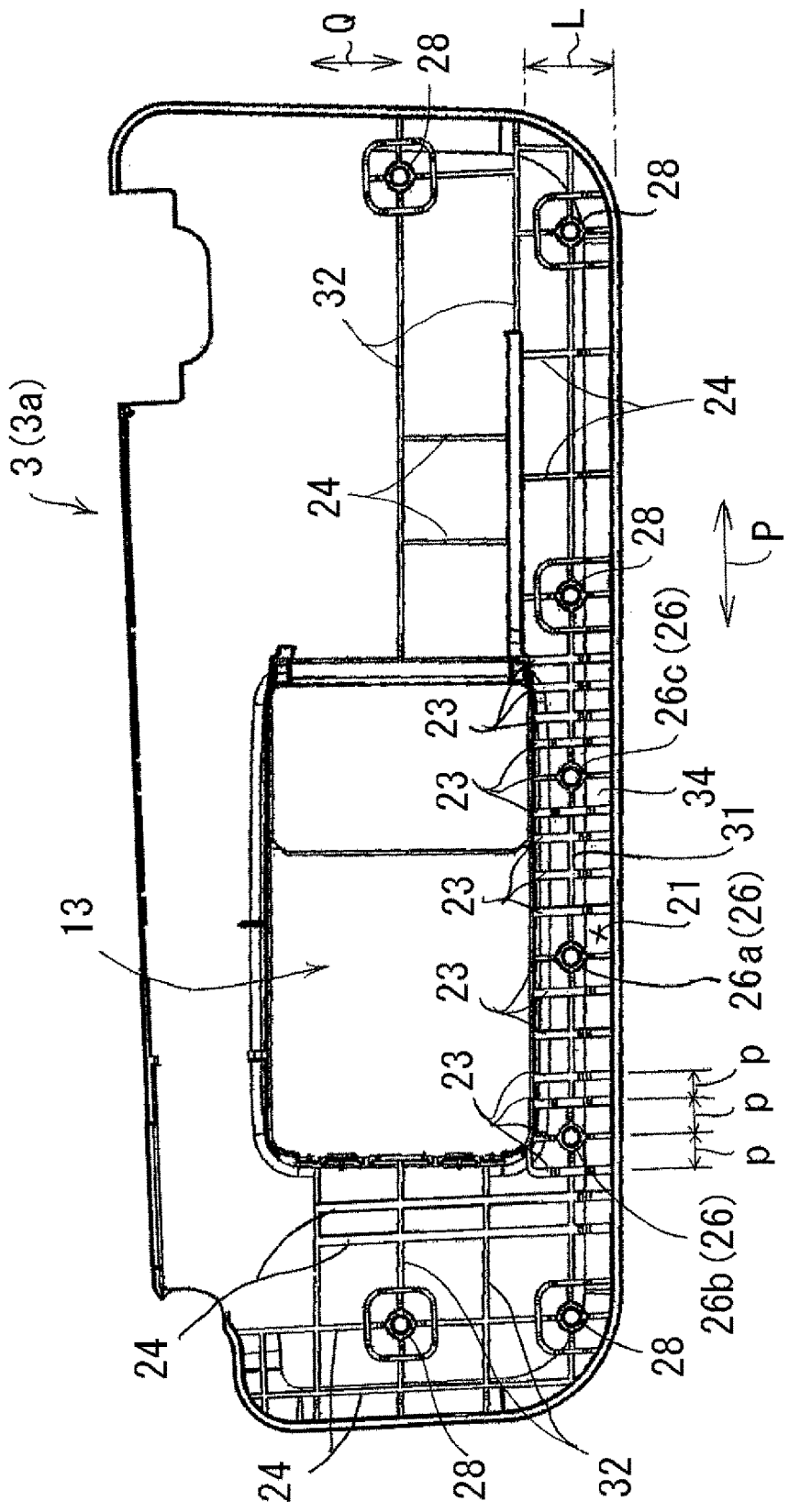
FIG. 4 is a view of the rear side of a sun visor body (front half body) according to the embodiment.

In the form described above, for example, the reinforcement boss (26) can be disposed so as to cross the reinforcement rib (23) and the additional reinforcement rib (31) (see, for example, FIG. 4 and so on). By virtue of this, the planar rigidity of the lower surface area of the sun visor body is further improved.

Another Vehicle Sun Visor

Another vehicle sun visor according to the present embodiment is a vehicle sun visor (1) (e.g., see FIG. 1 and so on) that includes: a sun visor body (3) supported so as to be freely rotated with respect to a vehicle ceiling (2) and between a storage position (A) and a use position (B); and a mirror (5) mounted on a mounting part (13) provided on the sun visor body (3). An area that is a part below the mounting part (13) of the surface of the sun visor body (3) located in the use position (B) is designated a lower surface area (21). In this area (21), a projecting reinforcement boss (26) for joining a pair of half bodies (3a, 3b) composing the sun visor body (3) is provided. The reinforcement boss (26) may include, for example, a middle reinforcement boss (26a) disposed below and in a middle side of the mounting part (13) in the long-axis direction, and an end reinforcement boss (26b, 26c) disposed below and in an end side of the mounting part (13) in the long-axis direction (see, for example, FIGS. 4, 5A, and so on). This additional vehicle sun visor according to the present embodiment can use, for example, the configuration described in the vehicle sun visor according to the above-described embodiment.

Further Another Vehicle Sun Visor

Further another vehicle sun visor according to the present embodiment is a vehicle sun visor (1) (e.g., see FIG. 1 and so on) that includes: a sun visor body (3) supported so as to be freely rotated with respect to a vehicle ceiling (2) and between a storage position (A) and a use position (B); and a mirror (5) mounted in a mounting part (13) provided on the sun visor body (3). An area that is a part below the mounting part (13) of the surface of the sun visor body (3) located in the use position (B) is designated a lower surface area (21). In this area (21), a plate thickness (t1) of a middle reinforcement part (34), which includes at least part of the lower surface area (21) and serves as the middle part of the sun visor body (3) in the long-axis direction (P), is greater than a plate thickness (t2) of the portion of the sun visor body (3) other than the middle reinforcement part (34) (see, for example, FIGS. 3, 5 and so on). This additional vehicle sun visor according to the present embodiment can use, for example, the configuration described in the vehicle sun visor according to the above-described embodiment.

Each symbol in parenthesis in each configuration described in the embodiment above indicates a correspondence relation with the specific configuration described in the embodiment below.

Embodiment

Referring to the drawings, an embodiment will be described in detail below.

(1) Configuration of Vehicle Sun Visor

Figure 2:
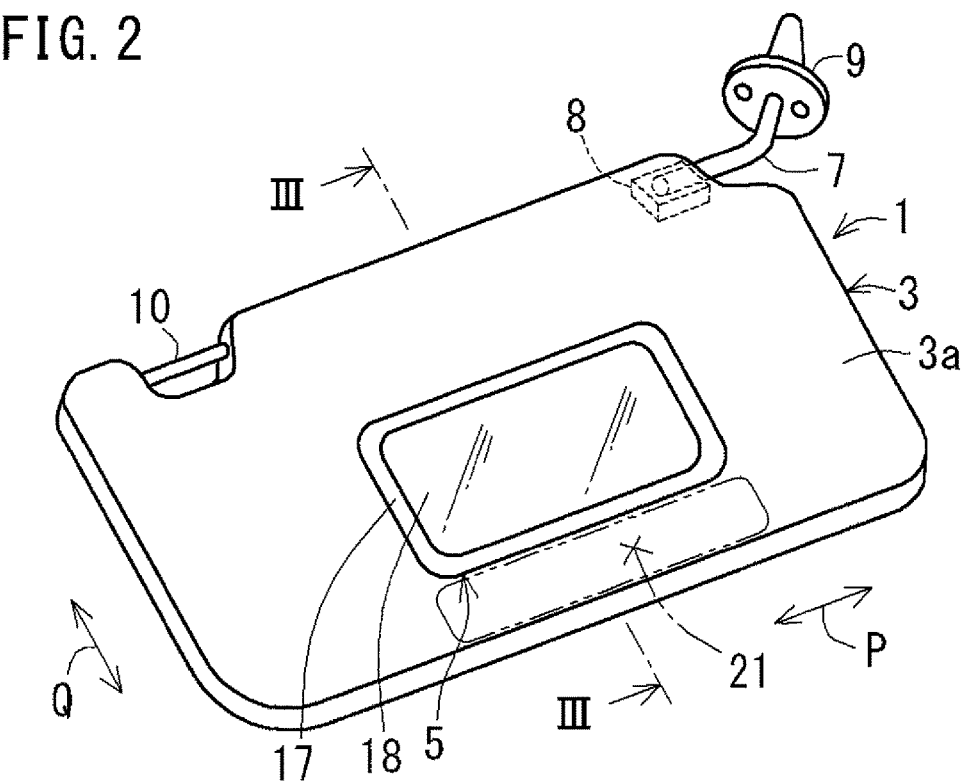
FIG. 2 is a perspective view of the vehicle sun visor.

As shown in FIGS. 1, 2, the vehicle sun visor according to the present embodiment includes a flat, substantially rectangular sun visor body 3 and a flat, substantially rectangular mirror 5 attached to the sun visor body 3. A bearing part 8 is mounted in one upper corner of this sun visor body 3, the bearing part 8 supporting one-end side of an approximately L-shaped support arm 7 such that the one-end side is freely rotated. The other-end side of this support arm 7 is mounted on the ceiling 2 of a vehicle cabin via a bracket 9. The other upper corner of the sun visor body 3 is provided with a holder 10, which is rotatably caught by a hook (not shown) provided on the vehicle ceiling 2. The sun visor body 3 is supported so as to be freely rotated between a storage position A for storing the sun visor body 3 along the surface of the vehicle ceiling 2 and a use position B for shielding from sunlight and so on along a windshield 11.

Figure 3:
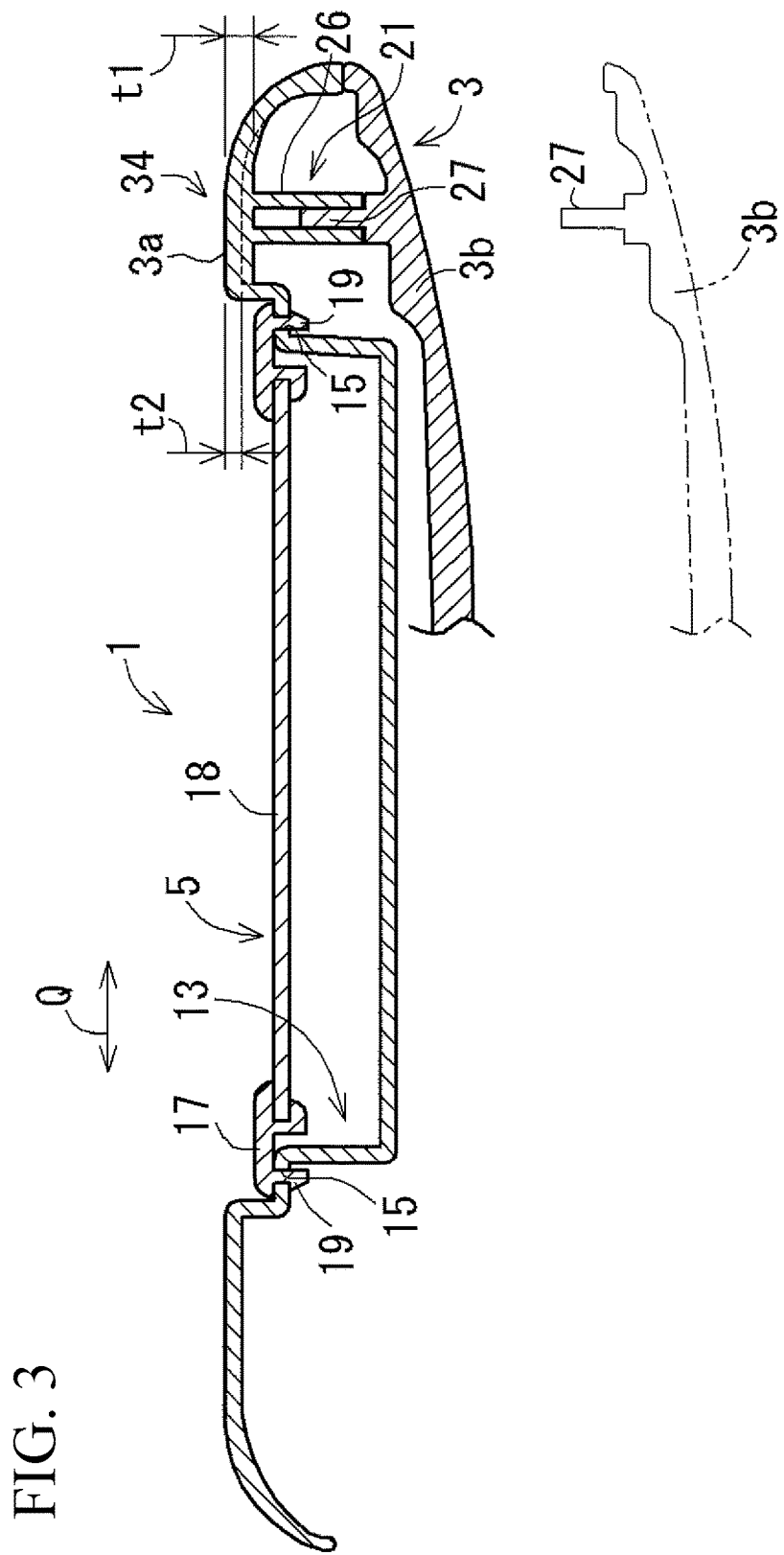
FIG. 3 is a sectional-view of the vehicle sun visor, taken along the III-III line in FIG. 2.

As shown in FIGS. 3, 4, the sun visor body 3 is formed by joining together a front half body 3a and a rear half body 3b, which have a shell form and are made of resin. A portion a little to the right or left of center of this front half body 3a (hereinafter referred to as "sun visor body 3") in the long-axis direction P thereof has a recessed mounting part 13 in which a mirror 5 is to be mounted. Lock holes 15 for mounting the mirror are formed in this mounting part 13. The front half body 3a faces the inside of the vehicle cabin in the use position B of the sun visor body 3, and the rear half body 3b faces the outside of the vehicle cabin in the use position B of the sun visor body 3.

The mirror 5 includes: a support frame 17 made of resin, and a mirror body 18 supported by the support frame 17 and having a mirrored surface. This support frame 17 has lock parts 19 insertable in the lock holes 15 of the mounting part 13. By inserting and locking the lock parts 19 into the lock holes 15, the mirror 5 is mounted in the mounting part 13. The mirror 5 described above may have a slide lid, cover, or the like, for covering the mirrored surface of the mirror body 18.

Figure 5A:
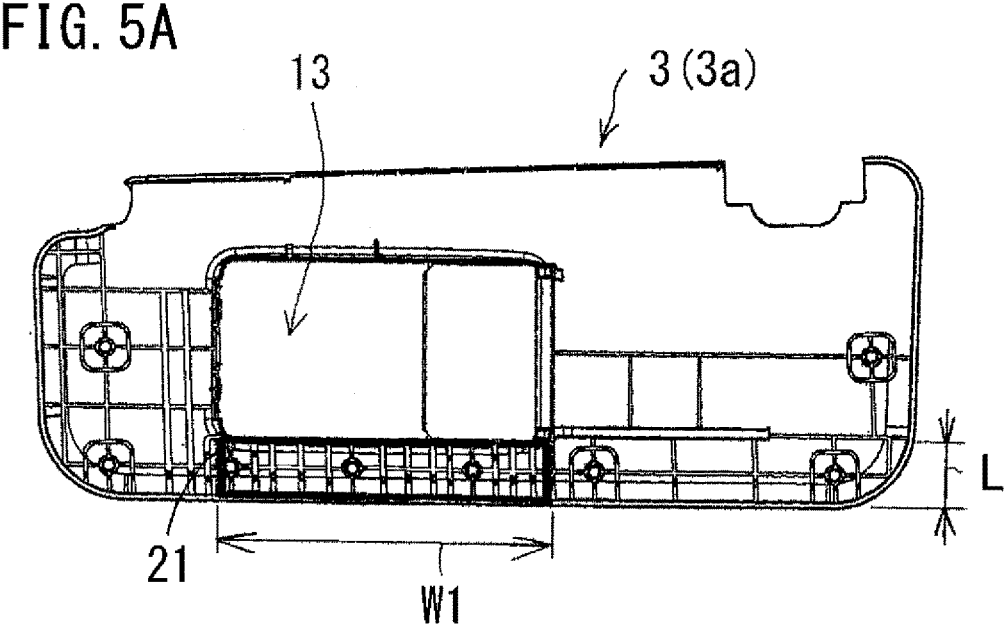
FIG. 5A illustrates a lower surface area of the sun visor body.

Here, as shown in FIG. 5A, an area below the mounting part 13 of the surface of the sun visor body 3 (i.e., the rear face of the front separate body 3a) located in the use position B is designated a lower surface area 21. This lower surface area 21 has a long-axis length W1 substantially identical to the length of the mounting part 13 in the long-axis direction P. The lower surface area 21 has a short-axis distance L substantially identical to the distance between the lower edge of the mounting part 13 and the lower edge of the sun visor body 3.

In the lower surface area 21, as shown in FIG. 4, a plurality of plate-shaped reinforcement ribs 23 (vertical ribs) extending in the short-axis direction Q of the sun visor body 3 are provided at predetermined intervals p (unequal pitches p) in the long-axis direction P of the sun visor body 3. The predetermined interval p is shorter than the distance L of the lower surface area 21 in the short-axis direction. The surface of the sun visor body 3, other than the lower surface area 21, is also provided with a plurality of ribs 24 extending in parallel with one another in the short-axis direction Q of the sun visor body 3.

The lower surface area 21 is also provided with a plurality of projecting reinforcement bosses 26 for joining the pair of separate bodies 3a, 3b. These reinforcement bosses 26 fit on bosses 27 provided on the rear separate body 3b, thereby joining the separate bodies 3a, 3b (see FIG. 3). The reinforcement bosses 26 include: a middle reinforcement boss 26a disposed below and in the middle side of the mounting part 13 in the long-axis direction; and end reinforcement bosses 26b, 26c disposed below and in the end side of the mounting part 13 in the long-axis direction. These reinforcement bosses 26a to 26c are disposed so as to cross the reinforcement ribs 23. The surface of the sun visor body 3, other than the lower surface area 21, is also provided with bosses 28 for joining the pair of separate bodies 3a, 3b.

In addition, in the lower surface area 21, a plate-shaped reinforcement rib 31 (lateral rib) extending in the long-axis direction P of the sun visor body 3 is provided so as to cross the plurality of reinforcement ribs 23. This reinforcement rib 31 is disposed so as to cross each of the reinforcement bosses 26a to 26c. The surface of the sun visor body 3, other than the lower surface area 21, is also provided with ribs 32 extending in the long-axis direction P of the sun visor body 3.

Figure 5B:
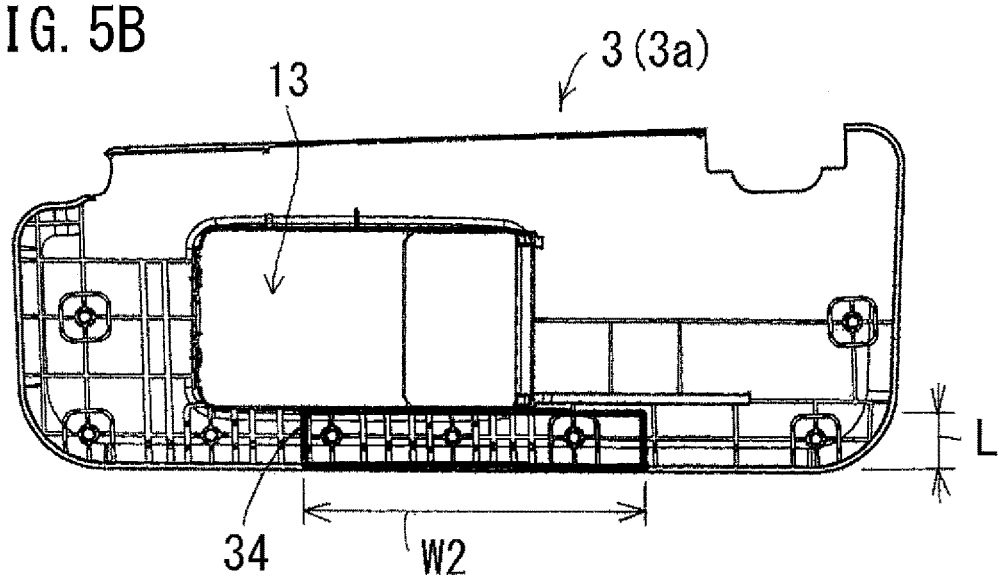
FIG. 5B illustrates a middle reinforcement part of the sun visor body.

Here, as shown in FIG. 5B, a portion including part of the lower surface area 21 and serving as the middle part of the sun visor body 3 in the long-axis direction P is designated a middle reinforcement part 34. In a portion where the lower surface area 21 is extended in the long-axis direction P of the sun visor body 3, this middle reinforcement part 34 is a portion corresponding to the middle part of the sun visor body 3 in the long-axis direction P. This middle reinforcement part 34 has a long-axis length W2 substantially identical to the length of the mounting part 13 in the long-axis direction P. The middle reinforcement part 34 has a short-axis distance L substantially identical to the distance between the lower edge of the mounting part 13 and the lower edge of the sun visor body 3. The plate thickness t1 (e.g., about 2.0 mm) of the middle reinforcement part 34 is set greater than the plate thickness t2 (e.g., about 1.5 mm) of the portion of the sun visor body 3 other than the middle reinforcement part 34 of the sun visor body 3 (see FIG. 3).

(2) Impact Absorption Test for Vehicle Sun Visor

Figure 6:
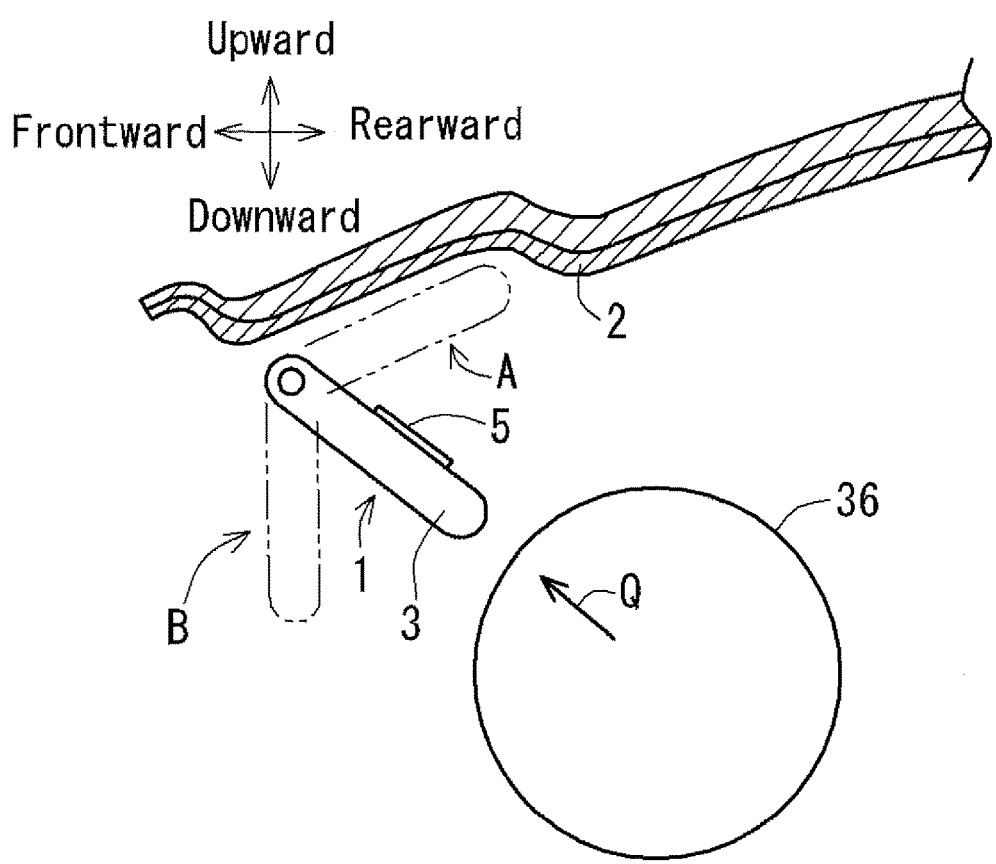
FIG. 6 illustrates an impact absorption test for the vehicle sun visor.

Next will be described an impact absorption test (also called a "horizontal striking test") for the vehicle sun visor 1 of the foregoing configuration. In this impact absorption test, as shown in FIG. 6, with the sun visor body 3 kept half open at the intermediate position between the storage position A and the use position B, an iron ball 36 with a diameter of 165 mm was made to collide with the lower edge of the sun visor body 3 in the short-axis direction Q of the sun visor body 3. As a result, before occurrence of cracking, deformation, or the like in the sun visor body 3, the support parts (i.e., the support arm 7 and holder 10) of the sun visor body 3 with respect to the vehicle ceiling 2 were, for example, broken, and the sun visor body 3 itself was detached from the vehicle ceiling 2 without the mirror 5 being detached from the mounting part 13.

(3) Advantageous Effects of Embodiment

According to the vehicle sun visor 1 according to the present embodiment, an area that is a part below the mounting part 13 of the surface of the sun visor body 3 located in the use position B is designated a lower surface area 21. In this area 21, a plurality of reinforcement ribs 23 extending in the short-axis direction Q of the sun visor body 3 are provided in parallel with one another at a predetermined interval p in the long-axis direction P of the sun visor body 3. The predetermined distance p between adjacent reinforcement ribs 23 of the plurality of reinforcement ribs 23 is shorter than a distance L in a short-axis direction of the lower surface area 21. By virtue of this, the planar rigidity of the lower surface area 21 of the sun visor body 3 is improved. Accordingly, even if load, impact, or the like is applied in a planar direction from the lower edge of the sun visor body 3, stress concentration at mirror corners is decreased. In addition, before cracking, deformation, or the like occurs in the sun visor body 3, the support parts of the sun visor body 3 with respect to the vehicle ceiling 2 are, for example, broken and, thereby, the sun visor body 3 itself is detached from the vehicle ceiling. Consequently, the mirror 5 is prevented from being detached from the sun visor body 3 and flying off. Furthermore, since only a specific lower surface area 21 of the entire sun visor body is rendered highly rigid, the amount of material required can be reduced.

In the present embodiment, the lower surface area 21 is provided with a projecting reinforcement boss 26 for joining the pair of half bodies 3a, 3b composing the sun visor body 3. By virtue of this, planar rigidity of the lower surface area 21 of the sun visor body 3 is further improved.

In the present embodiment, the plate thickness t1 of the middle reinforcement part 34 including at least part of the lower surface area 21 and serving as the middle part of the sun visor body 3 in the long-axis direction P is greater than the plate thickness t2 of the portion of the sun visor body 3 other than the middle reinforcement part 34. By virtue of this, planar rigidity of the lower surface area 21 of the sun visor body 3 is further improved.

In the present embodiment, the reinforcement boss 26 includes: a middle reinforcement boss 26a disposed below and in the middle side of the mounting part 13 in the long-axis direction P; and an end reinforcement boss 26b, 26c disposed below and in the end side of the mounting part 13 in the long-axis direction P. By virtue of this, planar rigidity of the lower surface area 21 of the sun visor body 3 is further improved.

In the present embodiment, in the lower surface area 21, an additional reinforcement rib 31 extending in the long-axis direction P of the sun visor body 3 is provided so as to cross the plurality of reinforcement ribs 23. By virtue of this, planar rigidity of the lower surface area 21 of the sun visor body 3 is further improved.

In the present embodiment, the reinforcement bosses 26 are disposed so as to cross the reinforcement rib 23 and the additional reinforcement rib 31. By virtue of this, the planar rigidity of the lower surface area of the sun visor body is further improved.

The present invention is not limited to the foregoing embodiment and, according to object and application, various changes and modifications can be made to the embodiment within the scope of the invention. That is, the foregoing embodiment was described using, as an example, the lower surface area 21 that has the long-axis length W1 substantially identical to the length of the mounting part 13 in the long-axis direction P. However, the invention is not limited by this, but may have a lower surface area that has a long-axis length, for example, longer or shorter than the length of the mounting part 13 in the long-axis direction P. The foregoing embodiment was described using, as an example, the lower surface area 21 that has a short-axis distance L substantially identical to the distance between the lower edge of the mounting part 13 and the lower edge of the sun visor body 3. However, the invention is not limited by this, but may have a lower surface area that has a short-axis distance, for example, shorter than the distance between the lower edge of the mounting part 13 and the lower edge of the sun visor body 3.

The foregoing embodiment was described using, as an example, a form in which the plurality of reinforcement ribs 23 are provided in parallel with one another at unequal pitch intervals. However, the invention is not limited by this, but the reinforcement ribs 23 may be provided in parallel with one another at equal pitch intervals.

In addition, the foregoing embodiment was described using, as an example, a middle reinforcement part 34 that includes part of the lower surface area 21. However, the invention is not limited by this, but the middle reinforcement part may include the entire lower surface area 21 or may coincide with the lower surface area 21.

The foregoing embodiment was described using, as an example, a sun visor body 3 that has three types of reinforcing means, which are reinforcement ribs 23, reinforcement bosses 26, and a middle reinforcement part 34. However, the invention is not limited by this, but the sun visor body may include at least one of the three type of the reinforcing means.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely used as technology relating to a vehicle sun visor not only for automobiles, buses, and trucks, but also for railroad vehicles such as railway trains and electric trains, construction vehicles, agricultural vehicles, industrial vehicles, and so on.

The invention claimed is:

1. A vehicle sun visor comprising:
   a sun visor body supported with respect to a vehicle ceiling so as to be freely rotated between a storage position and a use position; and
   a mirror mounted in a mounting part provided in the sun visor body, wherein:
   the sun visor body includes a lower surface area that is located directly below the mirror mounted in the mounting part of the sun visor body in the use position,
   a plurality of reinforcement ribs are only located in the lower surface area and a second plurality of ribs are located in a remainder of the sun visor body, the plurality of reinforcement ribs extending in a short-axis direction of the sun visor body and arranged in the lower surface area in parallel with one another at predetermined intervals in a long-axis direction of the sun visor body, the predetermined intervals being measured between an adjacent pair of reinforcement ribs of the plurality of reinforcement ribs, the predetermined intervals including at least a first interval measured between at least one first adjacent pair of reinforcement ribs and a second interval measured between at least one second adjacent pair of reinforcement ribs, the first interval being different than the second interval, each of the predetermined intervals of the plurality of reinforcement ribs is shorter than a height of the lower surface area in the short-axis direction of the lower surface area, and
   the sun visor body includes a lateral reinforcement rib extending in the long-axis direction, the lateral reinforcement rib intersecting with all of the plurality of reinforcement ribs located in the lower surface area, the lateral reinforcement rib intersecting with the plurality of reinforcement ribs at a portion other than an end of each of the plurality of reinforcement ribs.

2. The vehicle sun visor according to claim 1, wherein the lower surface area is provided with a projecting reinforcement boss configured to join a pair of half bodies composing the sun visor body.

3. The vehicle sun visor according to claim 2, wherein the reinforcement boss includes:
   a middle reinforcement boss disposed below and in a middle side of the mounting part in the long-axis direction; and
   an end reinforcement boss disposed below and in an end side of the mounting part in the long-axis direction.

4. The vehicle sun visor according to claim 2, wherein:
   the reinforcement boss is disposed so as to cross the lateral reinforcement rib and the reinforcement rib.

5. The vehicle sun visor according to claim 1, wherein a plate thickness of a middle reinforcement area that includes at least part of the lower surface area and serves as a middle area of the sun visor body in a long-axis direction is greater than a plate thickness of a portion of the sun visor body other than the middle reinforcement area.

6. The vehicle sun visor according to claim 2, wherein a plate thickness of a middle reinforcement area that includes at least part of the lower surface area and serves as a middle area of the sun visor body in a long-axis direction is greater than a plate thickness of a portion of the sun visor body other than the middle reinforcement area.

7. The vehicle sun visor according to claim 1, wherein:
   the predetermined interval is 5 mm to 15 mm; and the distance in the short-axis direction of the lower surface area is 15 mm to 30 mm.

8. A vehicle sun visor comprising:
a sun visor body supported with respect to a vehicle ceiling so as to be freely rotated between a storage position and a use position; and
a mirror mounted in a mounting part provided in the sun visor body, wherein:
the sun visor body includes a lower surface area that is located directly below the mirror mounted in the mounting part of the sun visor body in the use position, the lower surface area includes a projecting reinforcement boss that joins a pair of half bodies composing the sun visor body, the reinforcement boss includes:
a middle reinforcement boss disposed in the lower surface area and directly below and in a middle of the mounting part in a long-axis direction of the sun visor body; and
two end reinforcement bosses each disposed in the lower surface area and directly below the mounting part in the long-axis direction, each of the two end reinforcement bosses being located at respective ends of the lower surface area in the long-axis direction of the sun visor body, the middle reinforcement boss and each of the two end reinforcement bosses are only located in the lower surface area; and
the middle reinforcement boss and the two end reinforcement bosses are each formed by one of a plurality of reinforcement ribs located in the lower surface area, each of the middle reinforcement boss and the two end reinforcement bosses being located spaced apart from the mounting part and an outer edge of the sun visor body in a short-axis direction of the sun visor body, which is perpendicular to the long-axis direction of the sun visor body.

9. A vehicle sun visor comprising:
a sun visor body supported with respect to a vehicle ceiling so as to be freely rotated between a storage position and a use position; and
a mirror mounted in a mounting part provided in the sun visor body, wherein
the sun visor body includes a lower surface area that is located directly below the mirror mounted in the mounting part of the sun visor body in the use position, the lower surface area has a width, in a long-axis direction of the sun visor body, that is equal to a width of the mounting part,
the sun visor body includes a middle reinforcement area that is located at least partially in the lower surface area so as to overlap the lower surface area and extending beyond the lower surface area to have a width in the long-axis direction of the sun visor body and a height in the short-axis direction of the sun visor body that is at least equal to a height of the lower surface area, the width of the middle reinforcement area extending in the long-axis direction from within the lower surface area to a location partially between the lower surface area and an end of the sun visor body in the long-axis direction, the middle reinforcement area being located in a middle of the sun visor body in the long-axis direction of the sun visor body, a plate thickness of the middle reinforcement area, in a thickness direction orthogonal to the short-axis direction of the sun visor body and the long-axis direction of the sun visor body, is greater than a plate thickness, in the thickness direction, of a portion of the sun visor body other than the middle reinforcement area, and
the sun visor body includes a lateral reinforcement rib extending in the long-axis direction, the lateral reinforcement rib intersecting with all of the plurality of reinforcement ribs located in the lower surface area, the lateral reinforcement rib intersecting with the plurality of reinforcement ribs at a portion other than an end of each of the plurality of reinforcement ribs.

\* \* \* \* \*